United States Patent
Oliveira et al.

(10) Patent No.: US 7,581,035 B1
(45) Date of Patent: Aug. 25, 2009

(54) NON-DISRUPTIVE NETWORK TOPOLOGY MODIFICATION

(75) Inventors: Guy Oliveira, Dover, NH (US); James A. Hart, Rochester, NH (US)

(73) Assignee: NETAPP, Inc., Sunnyvale, CA (US)

( * ) Notice: Subject to any disclaimer, the term of this patent is extended or adjusted under 35 U.S.C. 154(b) by 711 days.

(21) Appl. No.: 10/212,951

(22) Filed: Aug. 6, 2002

Related U.S. Application Data

(60) Provisional application No. 60/312,847, filed on Aug. 16, 2001.

(51) Int. Cl.
*G06F 15/16* (2006.01)
*H04L 12/56* (2006.01)

(52) U.S. Cl. .................................... 709/251; 370/401

(58) Field of Classification Search ......... 709/248–253; 370/400–405; 398/59
See application file for complete search history.

(56) References Cited

U.S. PATENT DOCUMENTS

| | | | |
|---|---|---|---|
| 5,113,398 A * | 5/1992 | Howes ........................... | 714/4 |
| 5,182,747 A * | 1/1993 | Frenzel et al. ................ | 370/452 |
| 5,291,490 A * | 3/1994 | Conti et al. ................... | 370/392 |
| 5,425,017 A * | 6/1995 | Copley et al. ................. | 370/245 |
| 5,442,620 A * | 8/1995 | Kremer ........................ | 370/224 |
| 5,784,628 A * | 7/1998 | Reneris ........................ | 713/300 |
| 6,269,452 B1 * | 7/2001 | Daruwalla et al. ............. | 714/4 |
| 6,304,347 B1 * | 10/2001 | Beine et al. ................... | 398/38 |
| 6,370,146 B1 * | 4/2002 | Higgins et al. ............... | 370/400 |
| 6,661,800 B1 * | 12/2003 | Hayama et al. ............... | 370/403 |
| 6,928,050 B2 * | 8/2005 | Lynch et al. .................. | 370/224 |
| 6,982,958 B2 * | 1/2006 | Iruela et al. .................. | 370/236 |
| 2002/0003639 A1 | 1/2002 | Arecco et al. | |

FOREIGN PATENT DOCUMENTS

| JP | 11355333 A | * 12/1999 |
|---|---|---|
| JP | 2000032019 A | * 1/2000 |

OTHER PUBLICATIONS

"A NovelMedium Access Control Protocol for WDM-Based LAN's and Access Networks Using a Master/Slave Scheduler;" Modiano, Eytan and Barry, Richard; 2000 IEEE; Journal of Lightwave Technology, vol. 18, No. 4, Apr. 2000; pp. 461-468.

Muriel Medard, et al., "A Network Management Architecture for Robust Packet Routing in Mesh Optical Access Networks", LEOS Summer Topical Meetings, Jul. 2000, 35 pages.

* cited by examiner

*Primary Examiner*—Yasin M Barqadle
(74) *Attorney, Agent, or Firm*—Perkins Coie LLP

(57) ABSTRACT

A node is removed/added from a network with minimal disruption by actuating a mechanism on an adjacent node that provides an indication to a controller node, which commands a wrap of the adjacent nodes. Once the node is added/removed, the wrap can be removed to resume normal operation. With this arrangement, disruption of traffic flow is minimized as nodes are added and removed from the network.

17 Claims, 12 Drawing Sheets

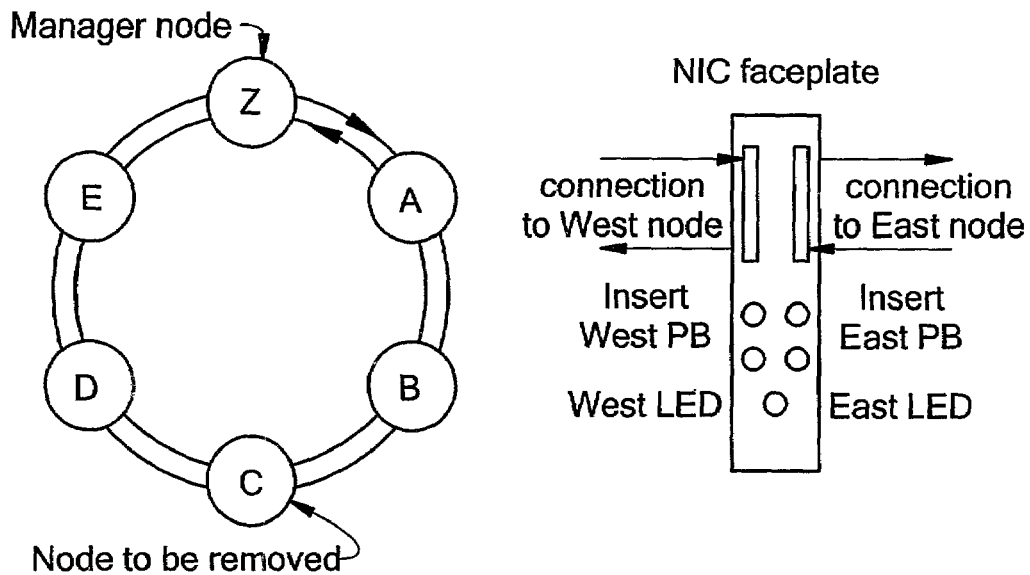
FIG. 4
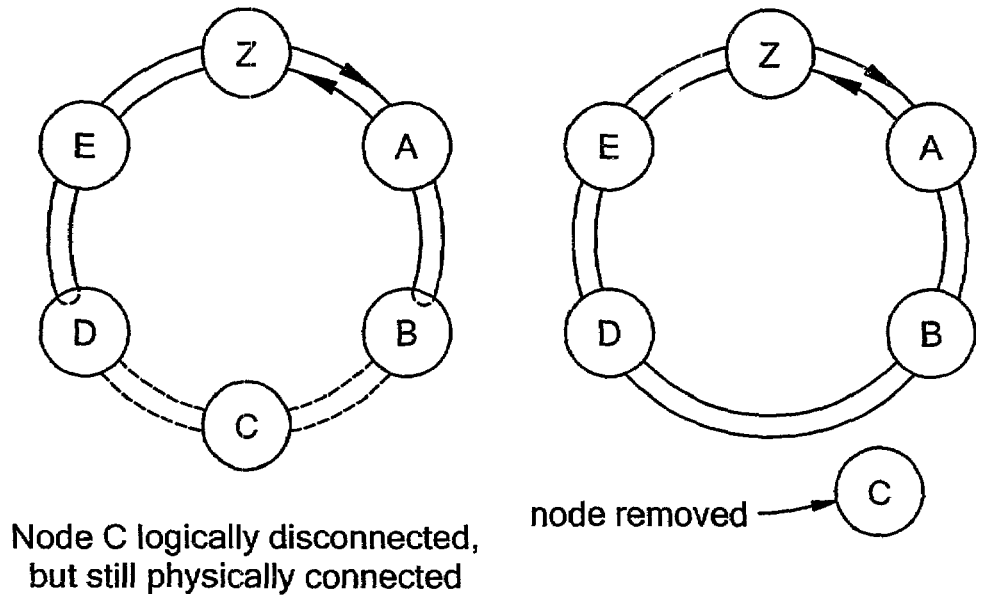
FIG. 5     FIG. 6

Detail B

Detail C

| Function | FC | ETH | Indicators WEST | EAST |
|---|---|---|---|---|
| Ethernet No Link | N/A | OFF | OFF | OFF |
| Ethernet Link Up | N/A | G | OFF | OFF |
| Ethernet Tx or Rx Activity | N/A | GF | OFF | OFF |
| Ethernet Port Fail | N/A | R | OFF | OFF |
| Ethernet Port Standby | N/A | AB | OFF | OFF |
| Fibre Channel No Link | OFF | N/A | OFF | OFF |
| Fibre Channel Link Up | G | N/A | OFF | OFF |
| Fibre Channel Tx or Rx Activity | GF | N/A | OFF | OFF |
| Fibre Channel Port Fail | R | N/A | OFF | OFF |
| Fibre Channel Port Standby | AB | N/A | OFF | OFF |
| Normal operation, control from the East | N/A | N/A | OFF | G |
| No control from east (sw at normal position)* | N/A | N/A | OFF | R |
| No control seen from West (sw at wrap position)* | N/A | N/A | R | OFF |
| Control seen from West (sw at wrap position) | N/A | N/A | A | OFF |
| Power - first on | YB (5sec)→ off | YB (5sec)→ off | GB | GB |
| Running Diagnostics | OFF | OFF | AB | AB |
| Diagnostics pass | OFF | OFF | G (5sec)→off | G (5sec)→off |
| Diagnostics fail | OFF | OFF | RB | RB |

| | | | | |
|---|---|---|---|---|
| Prepare to insert Node West - standby | N/A | N/A | AB | G |
| (Insert Node) West, cable removal - ready | N/A | N/A | (A→G) B | G |
| Node inserted West - Ring Re-established | N/A | N/A | AB (5sec)→off | G |
| Prepare to insert Node East - standby | N/A | N/A | A | G ↑ |
| (Insert Node) East, cable removal - ready | N/A | N/A | A | BG |
| Node inserted East - Ring Re-established | N/A | N/A | OFF | G (5sec)→off |
| Take node out of service | N/A | N/A | AB | GB (5sec)→G |
| Node ready to be removed | N/A | N/A | RB | RB |

G = Green
GF = Green Flashing
GB = Green Blinking
R = Red
RF = Red Flashing
RB = Red Blinking
Y = Yellow
YF = Yellow Flashing
YB = Yellow Blinking
A = Amber
AF = Amber Flashing
AB = Amber Blinking = 0.5-1Hz
Flashing ~ 10Hz
Off = LED OFF
N/A = Non Applicable
* Nodes on either side flip switches

| Push Button | | |
|---|---|---|
| INS-W | INS-E | |
| Push (5sec) | Released | Prepare to insert Node West - standby |
| Released | Released | (Insert Node) West, cable removal - ready |
| Released | Released | Node inserted West - Ring Re-established |
| Released | Push (5sec) | Prepare to insert Node East - standby |
| Released | Released | (Insert Node) East, cable removal - ready |
| Released | Released | Node inserted East - Ring Re-established |
| Push (5sec) | Push (5sec) | Take node out of service |
| Released | Released | Node ready to be removed |

*FIG. 11*

NON-DISRUPTIVE NETWORK TOPOLOGY MODIFICATION

CROSS REFERENCE TO RELATED APPLICATIONS

This application claims the benefit of U.S. Provisional Patent Application No. 60/312,847, filed on Aug. 16, 2001, which is incorporated herein by reference.

STATEMENT REGARDING FEDERALLY SPONSORED RESEARCH

Not Applicable.

BACKGROUND OF THE INVENTION

As is known in the art, nodes in a so-called ring network, e.g., FDDI Dual-Attached-Stations (DAS) and SONET Bidirectional Line Switched Ring, are typically daisy chained together. Each node has a link to the previous node and to the next node. The nodes automatically detect a link break and switch over to an alternate path as shown in FIG. 1. For example, in FDDI and SONET networks, the ring is automatically "wrapped" around the break to restore full connectivity to all the nodes.

When it is desired to add a node to an FDDI ring, for example, an operator intentionally breaks the ring by disconnecting the cables going to a node. The nodes surrounding the break assume that the link was broken by a fault and will "wrap the ring" until the ring is restored. Thus, the system behaves no differently than it would during an actual fault event: the system initiates a conventional protection mechanism and suffers a momentary loss of network connectivity. This is acceptable for some networks, as the addition or removal of a node is expected to be an infrequent event. For a data network like FDDI, the brief downtime while the network goes into protection mode is not problematic. SONET networks are designed to minimize fail-over time, specifying a maximum recovery time, because they can carry thousands of circuits that may be sensitive to even brief outages. However, in certain high-availability data networking environments, zero downtime with zero data loss is desired, even if a node needs scheduled maintenance or other activities that require disconnecting a cable.

It would, therefore, be desirable to overcome the aforesaid and other disadvantages.

SUMMARY OF THE INVENTION

The present invention provides a network topology change indicator mechanism that can be actuated by an operator (or automatically by the network) prior to addition/removal of a network node. With this arrangement, the network can adapt in advance to impending network topology changes so as to minimize traffic downtime. Although the invention is primarily shown and described in conjunction with multi-fiber optical networks in a ring topology, it is understood that the invention is applicable to networks in general in which it is desirable to minimize traffic downtime due to node insertion and removal.

In one aspect of the invention, a network includes first, second, and third nodes and a headend interconnected in a ring topology, where the first and third nodes are adjacent the second node. A network topology change indicator mechanism is coupled to the second node for enabling an operator to communicate impending node changes to the network. For example, the node adjacent a node to be removed can be wrapped prior to node removal by actuation of the indicator mechanism. In one embodiment, the network topology change indicator mechanism includes a first device corresponding to removal of the second node from the network, a second device corresponding to insertion of a first new node upstream of the second node and a third device corresponding to insertion of a second new node downstream of the second node. Actuation of the appropriate device in the indicator mechanism enables the network to prepare for the network topology change, e.g., node removal/addition.

BRIEF DESCRIPTION OF THE DRAWINGS

The invention will be more fully understood from the following detailed description taken in conjunction with the accompanying drawings, in which:

FIG. 4 is a schematic depiction of an exemplary ring network having a node removed non-disruptively in accordance with the present invention;

FIG. 5 is a schematic depiction showing the ring network of FIG. 4 having a node logically removed;

FIG. 6 is a schematic depiction showing the network of FIG. 4 having a node non-disruptively removed;

FIG. 11 is a tabular depiction of an exemplary indicator scheme for a node that can form a part of a ring network having non-disruptive topology modifications in accordance with the present invention.

DETAILED DESCRIPTION OF THE INVENTION

The present invention provides a mechanism for non-disruptively adding or removing a node from a ring network. While the network topology change indicator mechanism is primarily shown and described in conjunction with a button for informing the network of an impending topology change, it will be readily apparent to one of ordinary skill in the art that a wide variety of alternative mechanisms can be used without departing from the invention. Exemplary mechanisms in include buttons, keypads, levers, toggle switches, slide switches, rocker switches, rotary switches, DIP switches and other multi-position switches having at least two states.

In an exemplary embodiment, actuation of a push button informs the system that a link is about to be broken for the purposes of adding or removing a node. Informing the system in advance allows it to gracefully switch to protection mode before breaking the link, thus minimizing downtime and lost packets. That is, nodes can be added and removed non-disruptively. This is in contrast to the system detecting a broken, i.e., faulty, link after a period of time.

For example, conventional FDDI rings are designed to operate without such notification because it is assumed that the few seconds that it takes to detect and heal the artificial failure is acceptable. In known SONET networks, a planned node addition/removal might be entered into a network management system that suppresses alarms that are sounded when a link is intentionally broken. However, the system still experiences a brief outage, e.g., up to 50 ms in SONET, while the ring is being wrapped.

With the manual informing mechanism of the present invention, there is no loss of network traffic, and the operator need not communicate with a network management station. Alternatively, the indicator mechanism can be actuated automatically by the system under predetermined conditions.

FIGS. 2A-D show a non-disruptive addition of a node to a ring network 100 in accordance with the present invention. The ring network 100 includes a headend 102 and a plurality of nodes NODE A, NODE B, NODE C. The nodes and headend are interconnected by first and second fibers F1, F2 each of which carries data in the opposite direction so as to provide fault protection.

Figure 1:
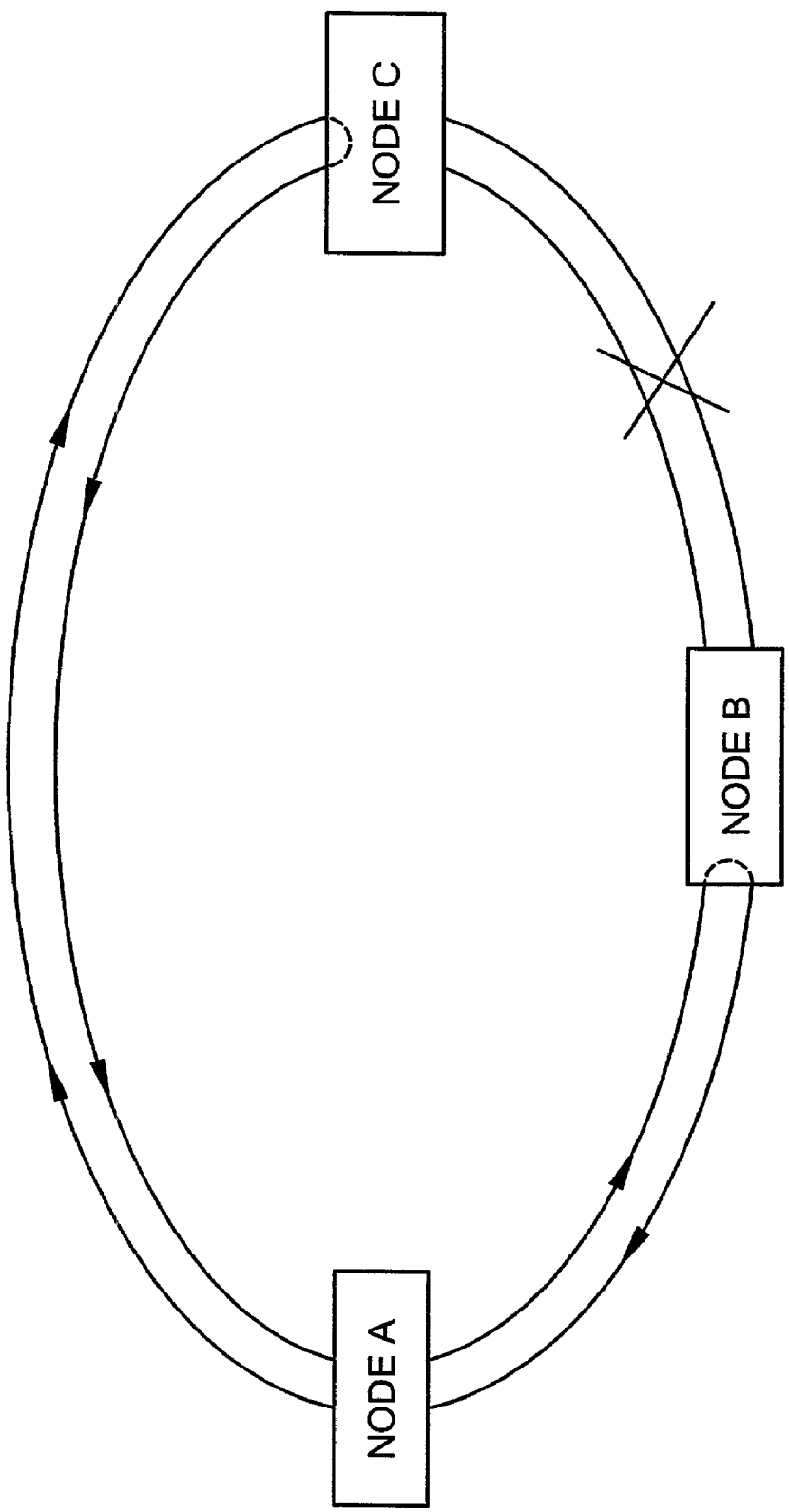
FIG. 1 is a schematic depiction of a prior art ring network.
Figure 2A:
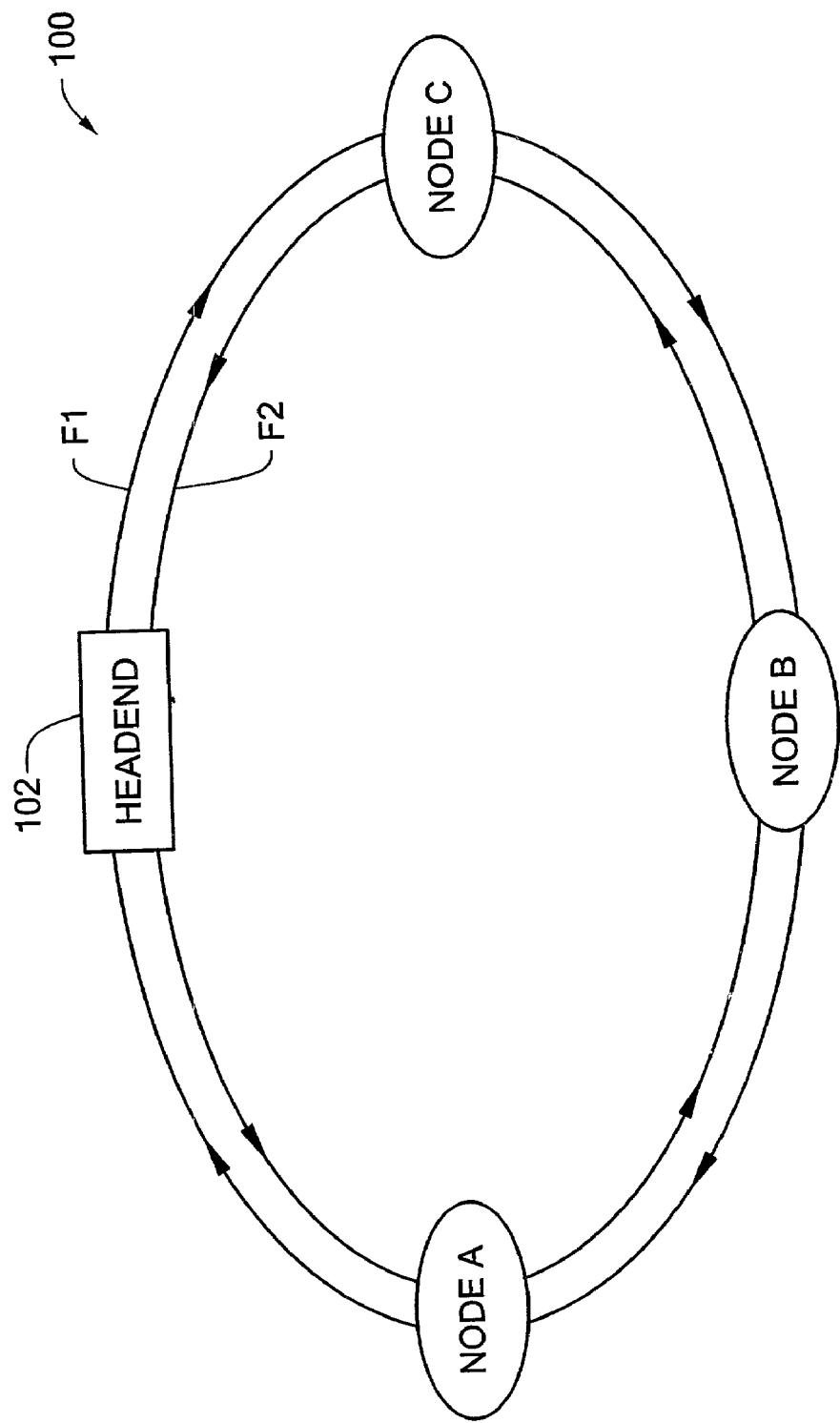
FIG. 2A is a schematic depiction of a ring network having non-disruptive topology modifications in accordance with the present invention.
Figure 2B:
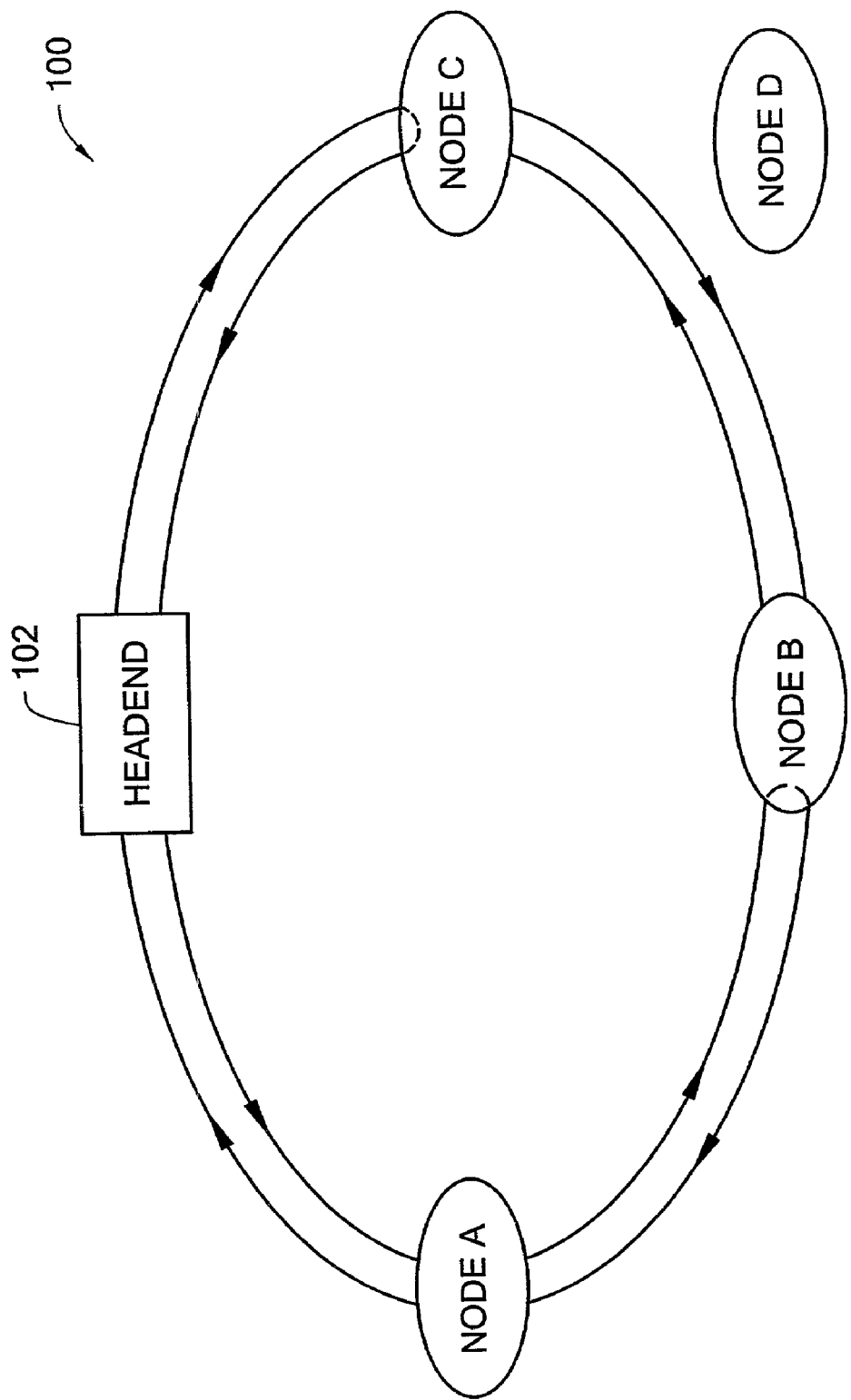
FIG. 2B is a schematic depiction of the ring network of FIG. 2A showing wrapping prior to adding the new node.

As shown in FIG. 2B, a further node NODE D is to be added to the ring network. Prior to insertion, the adjacent nodes NODE B, NODE C are wrapped (as shown with dashed lines) to maintain communication between the nodes.

Figure 2C:
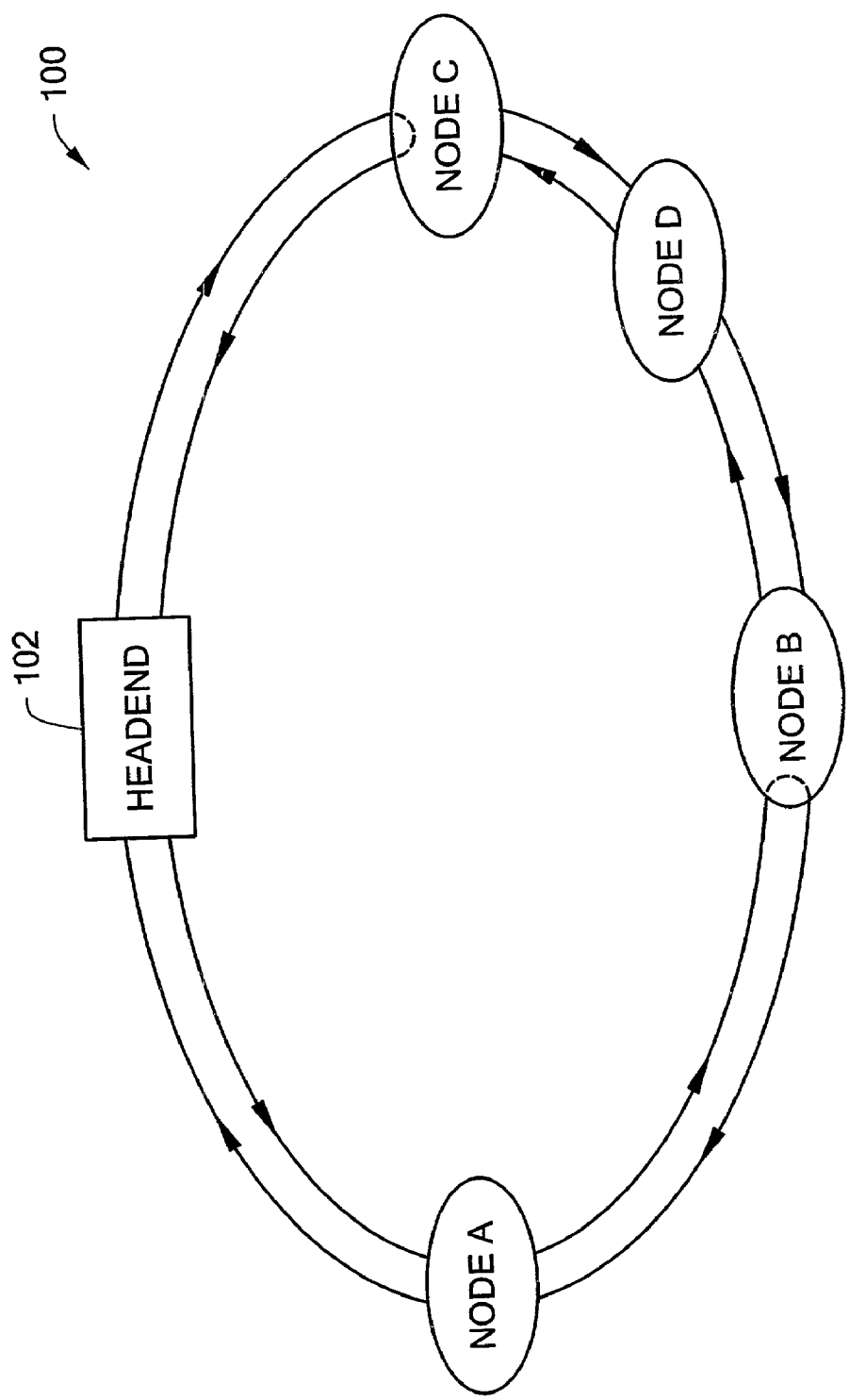
FIG. 2C is a schematic depiction of the ring network of FIG. 2A showing a node added to the network prior to unwrapping the nodes adjacent the new node.
Figure 2D:
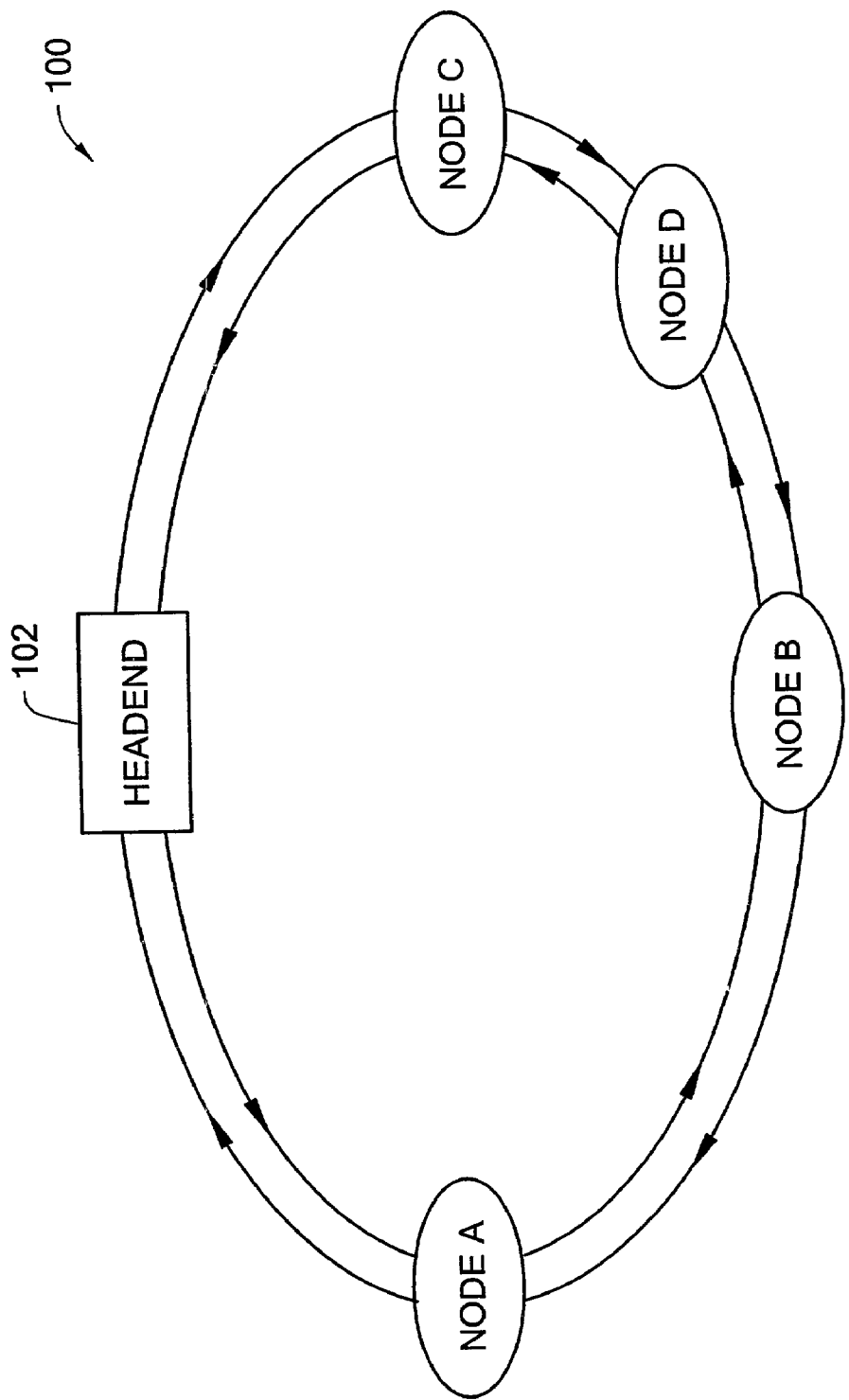
FIG. 2D is a schematic depiction of the ring network of FIG. 2A showing the new node added to the network.
Figure 3:
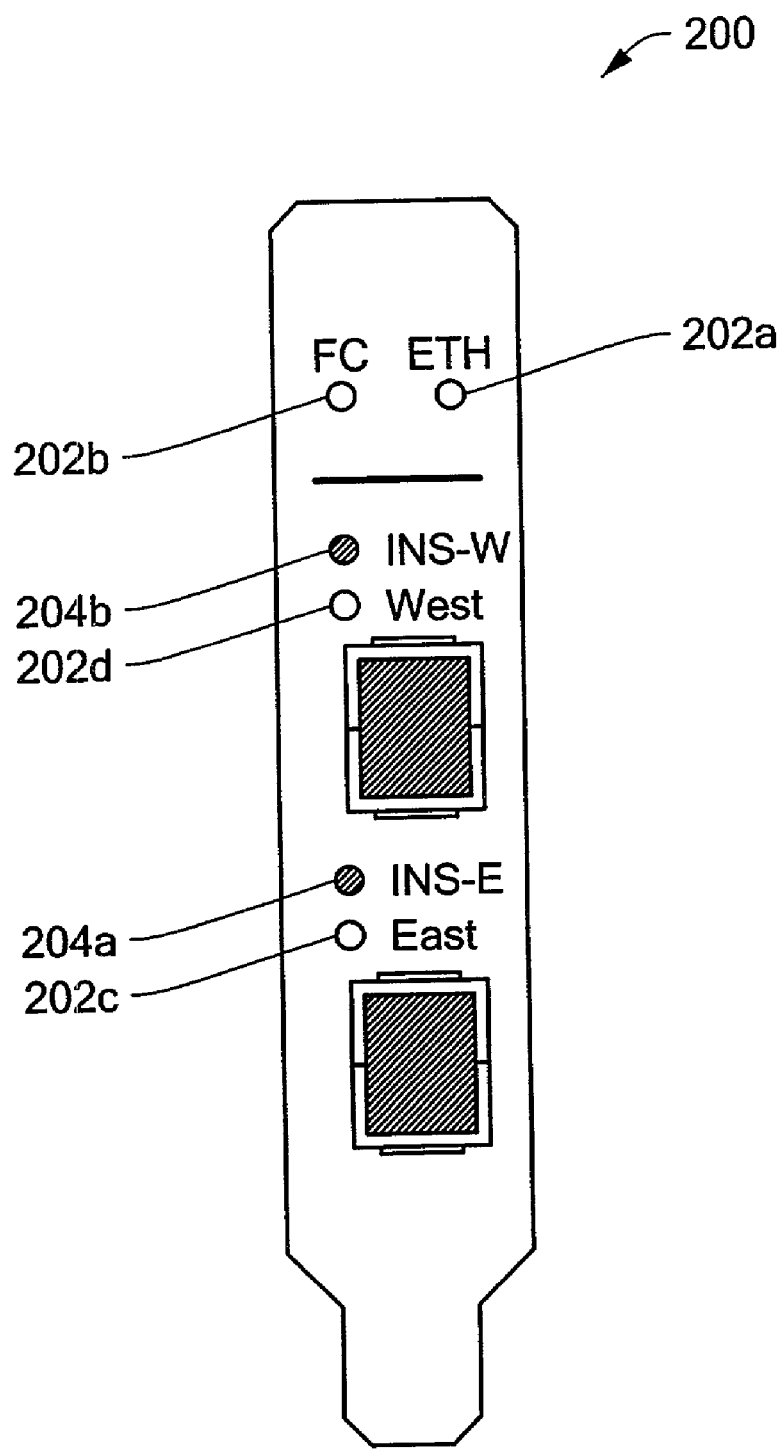
FIG. 3 is an exemplary front panel for a node that can form part of the network of FIG. 2A.
Figure 7:
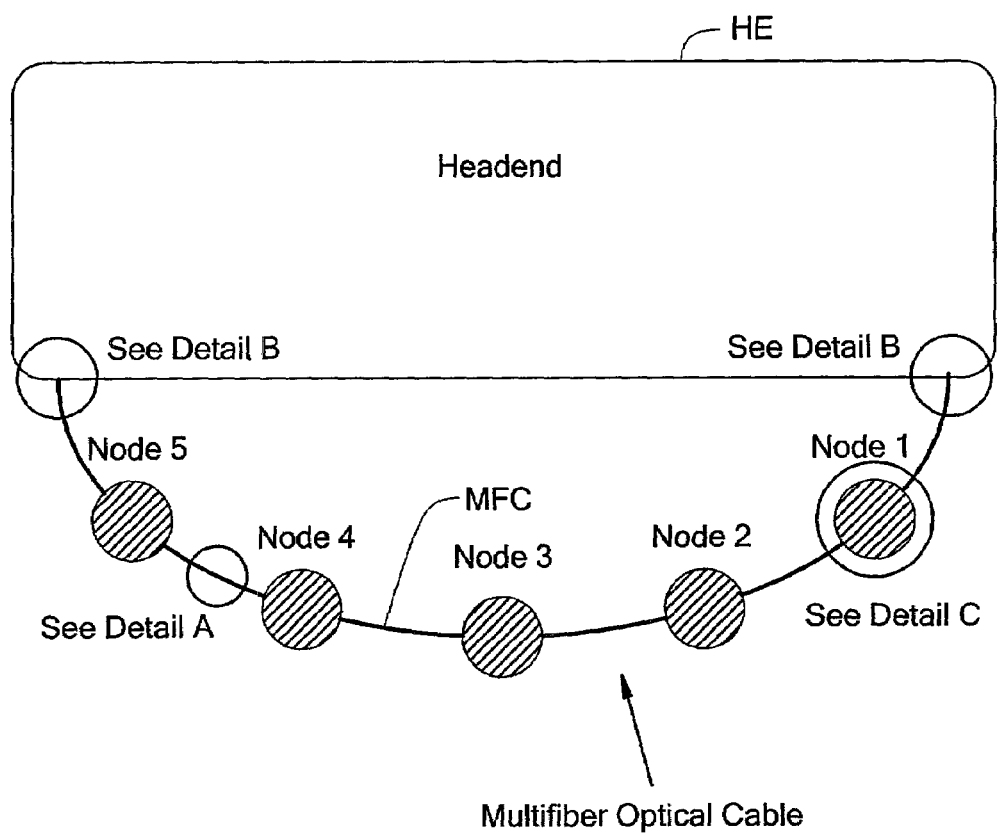
FIG. 7 is a schematic depiction of a further ring network having non-disruptive node addition/removal in accordance with the present invention.
Figure 8:
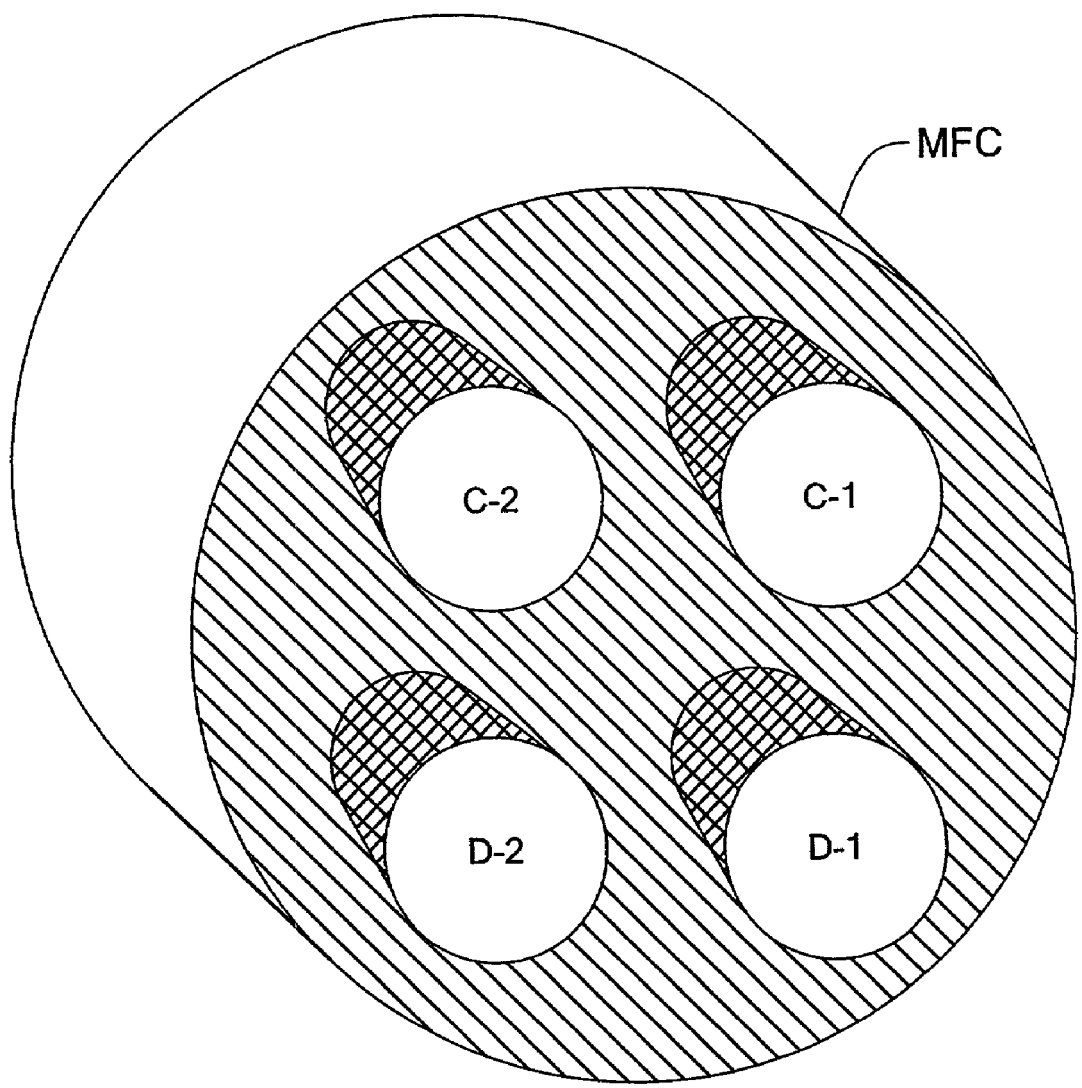
FIG. 8 is a schematic depiction showing further details of a multi-fiber cable that can form the links in the network of FIG. 7.
Figure 9:
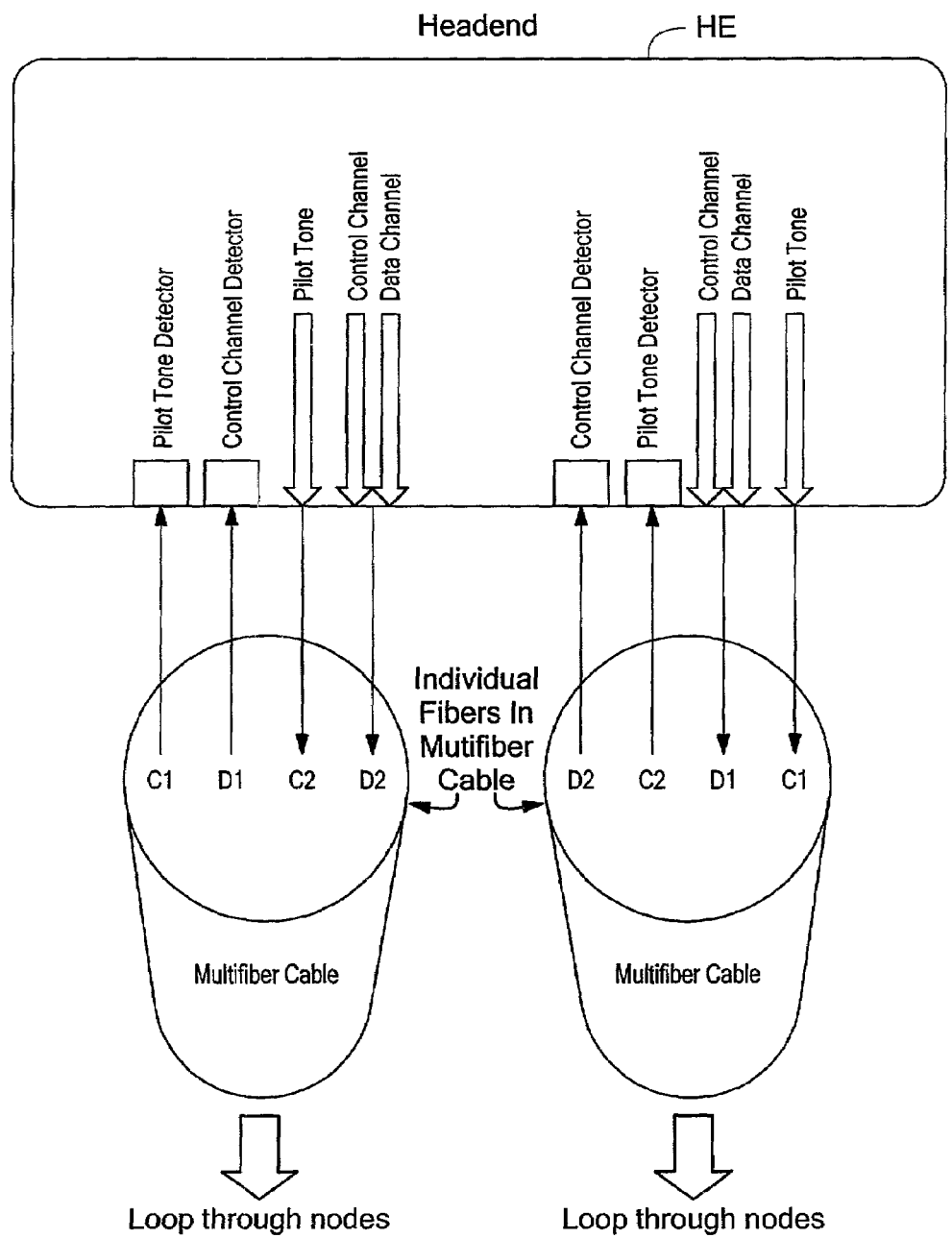
FIG. 9 is a schematic depiction showing further details of a headend and the connection to the multi-fiber cable that can form a portion of the network of FIG. 7.
Figure 10:
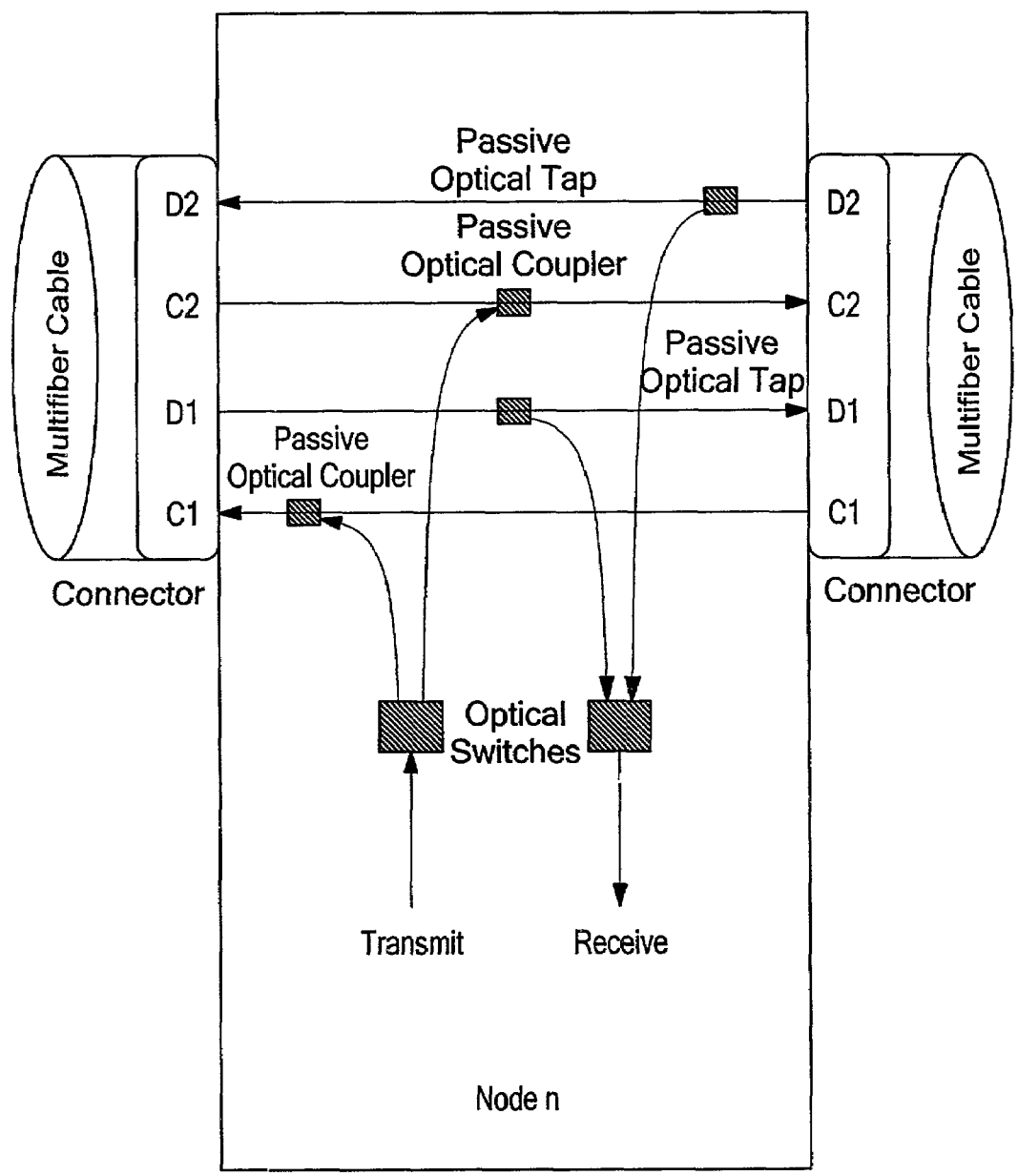
FIG. 10 is a schematic depiction showing further details of a node that can form a portion of the network of FIG. 7.

FIG. 3 shows an exemplary front panel 200 that can be provided on each of the nodes, such as coupled to a network interface card (NIC) in the node. The front panel 200 includes a series of LEDs 202. In one particular embodiment, the front panel 200 includes an east LED 202c and a west LED 202d. The front panel 200 further includes an insert node east button 204a and an insert node west button 204b. The east and west insert buttons 204 indicate the direction from a respective node that a node will be added or deleted from the network. It is understood that East and West refer to the direction perceived by a user facing the node front panel, i.e., the user would point to the "East node" with an extended right arm assuming one is looking down from above onto the network 100 of FIGS. 2A-D. It is further understood that the East and West directions can be referred to as upstream and downstream depending upon the data flow direction under normal operation. In addition, while pointing an arm may indicate a desired cable, it is possible that the "east" node is physically located on the west side if the cable bends around the node.

Upon actuation of the insert West button 204a on NODE C, for example, the node sends a message to the headend indicating that a node NODE D is to be added between nodes NODE B and NODE C. In one particular embodiment, the button must be depressed for a predetermined amount of time, e.g., five seconds, in order to initiate the non-disruptive node addition. The delay reduces the likelihood of accidental actuation of the switch. The headend then modifies the optical switches on NODE B and NODE C to wrap the connection, as shown in FIG. 2B. In an exemplary embodiment, actuation of the insert East button on NODE B would achieve the same effect.

Referring now to FIG. 2C, the new node NODE D is connected to the adjacent nodes NODE B, NODE C via cables. And in FIG. 2D, the optical or electronic switch positions are changed to remove the wrapping so that data node now passes through the new node NODE D during normal operation. It is understood that the headend controls node wrapping by controlling the position of the node optical switches.

In one embodiment, a series of indicators (e.g., LEDs) can provide an operator with status to facilitate adding and deleting nodes. For example, a LED can indicate that after depression of an insert node button wrapping is complete so that cables can be disconnected and connected to place the new node in the ring network. Upon detecting that the cables have been reconnected, for example, the headend commands the nodes NODE B, NODE C to place their optical switches in the normal position. The headend then discovers the new node D and resumes normal ring operation (FIG. 2D).

In one embodiment, depressing both the insert east and west buttons simultaneously indicates that the node is to be removed from the ring. In a further embodiment, consecutive actuation of an insert node pushbutton cancels the operation.

While the invention is primarily shown and described as a push button, it is understood that a variety of mechanisms can be used. Exemplary mechanisms include keypads, dials, punch keys, and the like.

EXAMPLE 1

Consider a two-fiber ring network as shown in FIG. 4, with a perspective of looking down onto the network. Each node has a network interface card (NIC) providing a duplex connection to the adjacent nodes. One exemplary NIC card is shown and described in U.S. Pat. No. 7,239,642, filed on Jul. 16, 2002, entitled "A Multi-Protocol Network Interface Card", which is incorporated herein by reference. The manager node Z knows the ordering of the nodes on the ring. Each NIC is equipped with the inventive Push Button Manual Wrap (PBMW) mechanism, including two "Insert" buttons and one "Remove" button.

Suppose node C needs to be removed from an operational network. To do so, the administrator presses the Remove button on node C, which sends a control message to node Z. Node Z then sends messages to all nodes commanding them to pause all further transmissions, followed by a message to nodes B and D commanding them to wrap the ring, as shown in FIG. 5. Once the wrapping is complete, node Z sends messages to the nodes informing them of the removal of node C, and that they may resume their transmissions (except to node C). At this point, node C is logically disconnected from the ring, and is ready to be physically disconnected; meanwhile, the other nodes can communicate. Next, node C is physically disconnected from the ring by removing cables, and nodes B and D are reconnected. Node Z senses that the ring has been "healed" (via messages from nodes B and D, or via other means of detection, such as a pilot-light in a tapped network, or by the presence of signals at the return end of the cable), and will send messages to nodes B and D to unwrap the ring and resume normal operation as shown in FIG. 6. This arrangement eliminates the loss of traffic on the network due to the unexpected removal of node C so as to minimize downtime.

A similar procedure is used to add a node. Suppose node C is to be returned to the ring. The administrator presses the "Insert East" button on node D, which sends a message to node Z. Node Z pauses traffic flow on the ring, commands nodes B and D to wrap, and then resumes traffic flow while node C is being reconnected to the ring. Node Z detects the presence of node C on the ring, and then commands nodes B and D to unwrap the ring. Again, this procedure minimizes the network downtime, and eliminates lost packets due to a sudden disconnection/reconnection of a cable. Instead of pressing the "Insert East" button on node D, one could equivalently press the "Insert West" button on node B.

It is understood that one of ordinary skill in the art can easily construct many variations of the exemplary embodiments shown and described above. It should be recognized that the methods described above can be used in a variety of networks, of differing physical mediums, topologies, and medium access protocols (MAC).

For example, the network can include a four-fiber cable, a manager node that implements a centrally controlled MAC, and NICs that use line-switching instead of protection-wrapping, as shown in FIGS. 7, 8, 9, and 10. As is well known to one of ordinary skill in the art, line-switching refers to a configuration in which there are two inputs to select from: If one doesn't work, "switch" to the other. And Protection-wrapping refers to SONET-style ring wrapping.

It will be readily apparent that button pressing can be coded to reduce the number of buttons on the front panel. For example, instead of having a "Remove" Button, the Insert buttons could be instrumented such that simultaneously pressing both Insert buttons invokes the node removal operation.

The interface card can use LEDs to indicate the status of the NIC and to provide other feedback to the operator. For example, LEDs can be used to signal when a card is ready for physical disconnection, or when it is functional after insertion into the ring. Multicolor LEDs and flashing, blinking, or Morse-code like patterns can convey additional information.

EXAMPLE 2

In this example, shown in FIGS. 7-10, the network topology is that of a loop of multi-fiber cable MFC beginning at a headend HE, connecting serially to the nodes Nodes 1-5 in the network, and then terminating at the headend. The fiber-cable MFC is composed of four independent optical fibers encased within the same cable. The individual fibers within the cable are labeled Collection-1 (C1), Collection-2 (C2), Distribution-1 (D1), and Distribution-2 (D2).

Although the multi-fiber cable MFC is serially connected to the nodes in the network in an apparent "daisy chain", the nodes are in fact passively and optically tapping each optical fiber in the multi-fiber cable. The nodes Node 1-5 make passive optical connections to the fiber-cable loop; they do not repeat or terminate the previous node's transmissions, nor do they perform any processing or modification on them; therefore, there are no optical-to-electronic-to-optical ("O-to-E-to-O") conversions at the nodes.

The Collection fibers C1, C2 are used to carry data from the nodes to the headend HE; C1 runs clockwise from the headend, and C2 runs counterclockwise. The Distribution fibers D1, D2 are used to transmit data and control from the headend HE to the nodes; D1 runs clockwise, and D2 runs counterclockwise. During normal operation, C1 collects transmissions from the nodes and directs them to the headend, with C2 serving as a standby fiber that is used if the fiber-cable is cut. The headend receives data from the nodes on C1 and distributes the data back to the nodes on D1, with D2 serving as a standby fiber in the event of a fiber cut. Nodes "speak" on the Collection fibers, and "listen" on the Distribution fibers. Note that the transmitting node's message passes through the headend HE before being heard by the receiving node, even if the receiving node is downstream of the transmitting node on the Collection fiber, again because nodes do not listen on the Collection fibers. Note that the directions of the fibers can be changed, so long as C1 and C2 propagate in opposite directions around the loop, and similarly with D1 and D2. In another embodiment, the network can allow downstream nodes to listen to the Collection fiber instead of the Distribution fiber.

The Distribution fibers D1, D2 also carry control messages from the headend HE to the nodes Node 1-5, on one or more wavelengths (the "control channel(s)") separate from the data wavelength(s) (the "data channel(s)"). The headend HE sends the control messages on both D1 and D2, and sends a control signal (a "pilot tone") on C1 and C2 over the control channel. These pilot tones are used to determine if a fiber-cut has occurred, and are ignored by the nodes.

At the endpoint of each optical fiber at the headend HE, there are detectors (FIG. 9) to determine the presence or absence of the control channels on the Distribution fibers and the pilot tones on the Collection Fibers. For example, the headend HE sends a pilot tone over the control channel on C1. If the headend detector does not receive this signal at the other end of the C1 optical fiber, then it can be deduced that the optical fiber has been cut. Similarly, if the headend HE does not detect the control channel at the endpoint of D1 or D2, then this indicates that the corresponding optical fiber has been cut. If the cable has been completely cut in one location and all individual optical fibers in the cable are severed at that point, the pilot tone on C1 will not be received at the headend, thus indicating the presence of the cut. This arrangement is further shown and described in U.S. application Ser. No. 10/186,178, filed on Jun. 27, 2002, which is incorporated herein by reference.

An exemplary protection switching mechanism for this network operates as follows. During normal operation of the network, nodes receive a continuous stream of control messages from the headend on D1. In the event of a fiber-cable cut, nodes downstream of the cut will no longer receive the stream of control messages; this will trigger the node to switch over to D2 to obtain control messages. Once the nodes downstream of the cut switch to D2, all nodes in the system will be receiving the control messages being sent by the headend indicating the presence of the fault. At this point, the headend and all the nodes are aware of the fault, and all nodes know on which side of the cable-cut they are located by virtue of the Distribution fiber that is still functional.

Inserting a node in the network entails temporarily breaking the loop. In order to minimally disrupt network operations during the addition of the new node, the headend needs to be informed in advance that the loop is going to be intentionally cut. The headend will then instruct the nodes to use the Collection and Distribution fibers that permit network operations during the planned cut. After this has been done, a new node may be inserted into the loop, and the headend will ignore fiber-cable cut alarms, as it is expecting this to happen. With the new node in place and the fiber-cable reconnected, the headend will begin the automatic discovery to learn the identity of the new node, and restore normal operation of the loop.

In one embodiment, a pushbutton on a node's network interface, such as that described above, is used to inform the headend HE of the planned break in the loop. Pressing the appropriate push-button ("East" or "West") on the node adjacent to the location of the insertion point of the new node initiates a message sent from the node to the headend. Upon receiving this message, the headend will command all the nodes in the network to pause their transmission, followed by a command to each node to arrange its optical switches so that it can communicate with the headend during the planned cut, as described above. Once all the nodes have properly switched to the alternate paths, the headend HE will allow transmissions to resume. At this point, it is safe to insert the new node into the ring. The headend will know that the new node has been inserted when the pilot tones and control signals are detected again. After detecting the new node, the headend will briefly pause transmissions from the nodes, command them to switch to their normal positions, and then resume transmissions. Thus, during the process of adding the new node, no transmissions are lost from abruptly breaking the loop.

A similar process is used to remove a node. Simultaneously pressing both the "Insert-East and "Insert-West" pushbuttons sends a message to the headend announcing that the node is to be disconnected. The headend pauses traffic on the ring, commands all the nodes to change their optical switch settings to appropriate positions, and then sends a message to the node that is to be disconnected, informing it that it may now be safely removed. This can be indicated by the appropriate LEDs on the faceplate of the NIC. After the node is removed and the fiber cables reconnected, the headend will sense that the ring has been reconnected and will command the node switches back to their normal positions, and then finally resume normal traffic flow.

In a further embodiment, one or more network nodes can include a network topology change indicator mechanism that includes a device corresponding to each node in the network. With this arrangement, an operator can actuate a push button or other such device for any node in the network that will be removed. Thus, an operator at the node can select any node in the network for removal from that one node. In addition, the mechanism can include a means for indicating that a new node will be added between any two existing network nodes.

FIG. 11 shows one particular exemplary front panel indicator scheme in accordance with the present invention. It will be readily apparent to one of ordinary skill in the art that a wide variety of indicator schemes, including more and fewer indicators, as well as various indicator types, are possible without departing from the present invention.

While various network and cable configurations are shown, it understood that variations to the exemplary network and cable embodiments will be readily apparent to one of ordinary skill in the art and well within the scope of the present invention. For example, while a four-fiber cable is illustrated with the fibers in a given order and having an exemplary direction, it will appreciated that the number, order and direction can vary. In addition, the indicator mechanism can be modified to signal other impending changes, such as the upcoming removal of a NIC, which is contemplated by the present invention. For example, simultaneous actuation of East and West insert node buttons can indicate removal of the NIC for that node. The particular network configurations shown and described herein are intended to facilitate an understanding of the invention without limiting the invention thereto. For example, a ring network, as used herein, should be construed broadly to include various ring-type network and bus configurations.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for non-disruptively modifying a network having a control node and a plurality of additional non-control nodes physically connected in a ring, comprising:

receiving a first indication from a first non-control node of the plurality of additional non-control nodes that the first non-control node will be physically removed from the network, the first indication having been generated by the first non-control node in response to actuation by a user of a topology change notification mechanism implemented as a physical actuation mechanism on the first node;

in response to the receipt of the first indication, modifying data flow in the network to avoid data flow through the first non-control node while maintaining the data flow in the network;

receiving a second indication that the first non-control node has been physically removed and that the ring has been reconnected; and resuming the data flow over the ring network in response to receiving the second indication.

2. The method according to claim 1, wherein modifying the data flow further includes wrapping nodes adjacent to the non-control first node.

3. The method according to claim 2, wherein non-control nodes adjacent the first non-control node includes a second non-control node and a third non-control node.

4. The method according to claim 3, wherein the second indication is generated by the second or third non-control node.

5. The method according to claim 1, wherein the control node comprises a headend with the function of controlling the network data flow.

6. The method according to claim 1, wherein the first indication is received using the ring.

7. The method according to claim 1, wherein network nodes are connected by a four-fiber cable.

8. The method according to claim 7, wherein the four-fiber cable includes first and second collection fibers and first and second distribution fibers.

9. The method of claim 1, wherein each of the plurality of additional non-control network nodes has a different manual informing mechanism installed inside to generate indications of modifying the network.

10. A method for non-disruptively modifying a ring network having a control node and a plurality of additional non-control network nodes physically connected in a ring topology, comprising:

receiving a first indication from a non-control network node, the first indication having been generated by the non-control network node in response to actuation by a user of a mechanism dedicated for topology change notification implemented on the non-control network node as a physical actuation mechanism coupled to a circuit carrier device in the non-control network node, wherein the first indication is to request physical removal of the non-control network node from the network;

in response to the received indication, modifying data flow in the network to avoid data flow through the non-control network node while maintaining the data flow in the network;

receiving a second indication indicating that the non-control network node has been physically removed and that the ring has been reconnected; and resuming data flow over the ring network in response to receiving the second indication.

11. The method according to claim 10, wherein modifying the data flow further includes wrapping nodes adjacent to the non-control network node.

12. The method according to claim 11, further including providing a headend for controlling the network data flow, and wherein the indication that the ring has been reconnected is sent from network nodes of the plurality of additional non-control network nodes adjacent to the non-control network node.

13. A method for non-disruptively modifying a ring network having a control node and a plurality of additional non-control nodes in a ring topology, comprising:

receiving at the control node a first indication from a first non-control node of the plurality of additional non-control nodes, the first indication indicating that the first non-control node will be physically removed from the network, the first indication having been generated by the first non-control node in response to actuation by a user of a mechanism dedicated for topology change notification implemented on the first non-control node as a physical actuation mechanism coupled to a network interface card in the first non-control node;

in response to the received first indication, modifying data flow in the network, by the control node, to avoid data flow through the first non-control node while maintaining the data flow in the network;

receiving at the control node a second indication that the first non-control node has been physically removed from the ring network and the ring network has been reconnected; and resuming the data flow over the ring network, by the control node, in response to receiving the second indication.

14. A non-control network node for use in a ring network, the non-control network node comprising:

a circuit carrier device to enable the non-control network node to communicate with other nodes on the ring network; and a mechanism dedicated for topology change notification coupled to the circuit carrier device and implemented on the non-control network node as a physical actuation mechanism, in response to actuation of which the non-control network node transmits an indication onto the ring network, to a control node, to indicate to the control node that the non-control network node is to be removed from the ring network, wherein the mechanism dedicated for topology change notification comprises:

a first actuator, actuation of which signals that a node is to be inserted onto the ring network adjacent to the non-control network node in a first direction from the non-control network node; and a second actuator, actuation of which signals that a node is to be inserted onto the ring network adjacent to the non-control network node in a second direction from the non-control network node.

15. A non-control network node as recited in claim 14, wherein actuation of the first actuator and the second actuator together cause the non-control network node to generate the indication to indicate that the non-control network node is to be removed from the ring network.

16. A non-control network node as recited in claim 14, wherein the dedicated topology change notification mechanism is implemented on an external portion of a housing of the non-control network node.

17. A non-control network node as recited in claim 14, wherein the circuit carrier device comprises a network interface card.

* * * * *